US012110169B2

(12) United States Patent
Rege et al.

(10) Patent No.: US 12,110,169 B2
(45) Date of Patent: Oct. 8, 2024

(54) PRESSURIZED BREWING, GAS INFUSION AND DISPENSING MACHINE

(71) Applicant: PERFECTWERKS SOLUTIONS INC., Snoqualmie, WA (US)

(72) Inventors: Evan C. Rege, Portland, OR (US); Brian Sonnichsen, Beavercreek, OR (US); Shawn Huff, Portland, OR (US)

(73) Assignee: PERFECTWERKS SOLUTIONS, INC., Snoqualmie, WA (US)

( * ) Notice: Subject to any disclaimer, the term of this patent is extended or adjusted under 35 U.S.C. 154(b) by 0 days.

(21) Appl. No.: 17/342,087

(22) Filed: Jun. 8, 2021

(65) Prior Publication Data

US 2021/0380332 A1 Dec. 9, 2021

Related U.S. Application Data

(60) Provisional application No. 63/036,245, filed on Jun. 8, 2020.

(51) Int. Cl.
*B65D 83/66* (2006.01)
*B65D 47/06* (2006.01)
(Continued)

(52) U.S. Cl.
CPC ............ *B65D 83/66* (2013.01); *B65D 47/06* (2013.01); *B65D 47/20* (2013.01);
(Continued)

(58) Field of Classification Search
CPC ........ B65D 83/66; B65D 47/06; B65D 47/20; B65D 51/2814; B65D 83/22; B65D 83/32;
(Continued)

(56) References Cited

U.S. PATENT DOCUMENTS 3,920,158 A * 11/1975 Meshberg .............. B65D 83/60 239/306
3,982,668 A * 9/1976 Riccio .................. B65D 83/682 222/402.18
(Continued)

FOREIGN PATENT DOCUMENTS

EP 0164218 A2 12/1985
EP 2295372 B1 3/2012

OTHER PUBLICATIONS

International Search Report and Written Opinion of the International Searching Authority issued in International Application No. PCT/US2021/036488, mailed Dec. 13, 2021, 22 pages.

*Primary Examiner* — Frederick C Nicolas
(74) *Attorney, Agent, or Firm* — Workman Nydegger

(57) ABSTRACT

A pressurized beverage dispenser having a beverage container and a cap. The cap includes a cap body, a compressed-gas cartridge, an external straw, a discharge chamber, a metering valve, a diaphragm, and an actuator. The discharge chamber within the cap body is in fluid communication with an internal passageway of the external straw. The metering valve allows a flow of beverage from the beverage container to the discharge chamber when the metering valve is open and substantially precludes the flow of beverage when the metering valve is closed. The diaphragm opens the metering valve when the diaphragm is activated and closes the metering valve when the diaphragm is deactivated. The diaphragm also activates when a user sucks on the outlet end of the external straw to create suction within the discharge chamber. The actuator on the cap body activates the diaphragm when the user manually engages the actuator.

30 Claims, 7 Drawing Sheets

(51) Int. Cl.

| | |
|---|---|
| ***B65D 47/20*** | (2006.01) |
| ***B65D 51/28*** | (2006.01) |
| ***B65D 83/22*** | (2006.01) |
| ***B65D 83/32*** | (2006.01) |
| ***B65D 83/38*** | (2006.01) |
| ***B67D 1/00*** | (2006.01) |
| ***B67D 1/04*** | (2006.01) |
| ***B67D 1/08*** | (2006.01) |
| ***B67D 1/12*** | (2006.01) |

(52) U.S. Cl.
CPC ......... *B65D 51/2814* (2013.01); *B65D 83/22* (2013.01); *B65D 83/32* (2013.01); *B65D 83/384* (2013.01); *B67D 1/0082* (2013.01); *B67D 1/0418* (2013.01); *B67D 1/0802* (2013.01); *B67D 1/1252* (2013.01); *B67D 1/1279* (2013.01); *B67D 2001/0481* (2013.01); *B67D 2001/0487* (2013.01); *B67D 2001/0825* (2013.01)

(58) Field of Classification Search
CPC .. B65D 83/384; B67D 1/0802; B67D 1/1252; B67D 1/1279; B67D 2001/0481; B67D 2001/0487; B67D 2001/0825; B67D 1/0418; B67D 1/0082
See application file for complete search history.

(56) References Cited

U.S. PATENT DOCUMENTS

| | | | | | |
|---|---|---|---|---|---|
| 4,147,283 | A * | 4/1979 | Mascia | B65D 83/66 | 222/399 |
| 4,392,578 | A * | 7/1983 | Fipp | B65D 81/2076 | 222/401 |
| 4,617,973 | A * | 10/1986 | Hagan | B67D 1/0456 | 141/2 |
| 4,694,975 | A * | 9/1987 | Hagan | B67D 1/0456 | 222/464.5 |
| 4,702,396 | A * | 10/1987 | Gwiazda | B65D 83/66 | 215/311 |
| 4,773,571 | A * | 9/1988 | Hagan | B67D 1/0456 | 222/394 |
| 5,022,565 | A * | 6/1991 | Sturman | B67D 1/0418 | 222/399 |
| 5,395,012 | A * | 3/1995 | Grill | B65B 31/08 | 222/399 |
| 8,070,023 | B2 * | 12/2011 | Vitantonio | B67D 1/0418 | 222/400.7 |
| 8,191,740 | B2 | 6/2012 | Hoss et al. | | |
| 8,444,011 | B2 * | 5/2013 | Paauwe | B67D 1/1252 | 222/23 |
| 9,352,949 | B2 * | 5/2016 | Rege | B67D 1/04 | |
| 10,207,911 | B2 * | 2/2019 | Landman | B67D 1/1455 | |
| 10,308,494 | B2 * | 6/2019 | Landman | B67D 1/1455 | |
| 10,870,568 | B2 * | 12/2020 | Sonnichsen | B67D 1/0418 | |
| 10,974,947 | B1 * | 4/2021 | Qiao | B67D 1/0406 | |
| 11,572,265 | B2 * | 2/2023 | Radford | B67D 1/1252 | |
| 2009/0261129 | A1 * | 10/2009 | Vitantonio | B67D 1/0082 | 222/394 |
| 2015/0336785 | A1 * | 11/2015 | Rege | B67D 1/1438 | 222/399 |

* cited by examiner

PRESSURIZED BREWING, GAS INFUSION AND DISPENSING MACHINE

CROSS-REFERENCES TO RELATED APPLICATIONS

This patent application claims the benefit of U.S. Provisional Application No. 63/036,245, filed Jun. 8, 2020. That application is incorporated into the present disclosure by this reference.

TECHNICAL FIELD

The subject matter is related to a portable system and methods for carbonating, storing, and dispensing a beverage.

BACKGROUND

Force carbonation and dispensing systems, generally called soda siphons, have been available for several decades. Generally, these devices release a predefined amount of carbon dioxide or other infusing gas into a controlled volume of airspace above a controlled volume of water or other liquid to create an infused beverage. When the gas is released by breaking of a seal on the single use gas cartridge, the gas is released into the vessel's airspace until the pressure reaches equilibrium with the gas cartridge. This pressure may be as high as 200 PSI (pounds per square inch) under normal circumstances, and several times higher in cases where the user misuses the product, such as by overfilling of the vessel with liquid. As the vessel is agitated, or after the passage of sufficient time, the gas dissolves into the beverage, lowering the overall pressure within the vessel.

Once the gas has been sufficiently dissolved into the beverage, these devices are able to dispense beverage by way of a hand valve. The most common valve system is one where a seal is held against a seal seat by spring force. The hand actuator then separates the seal from the seat by overcoming the seating spring force. The seal may be designed so that the pressure within the bottle also acts against the spring force, so that a sufficiently high pressure will force the seal to open and dispense without actuation of the hand valve. This is an effective method of overpressure relief, though it results in beverage being dispensed at an unexpected time for the user.

The other common type of force carbonation system uses a large reservoir of compressed gas which is injected into water or other liquid held within a separate volume. This injection also creates the agitation that allows for rapid dissolution of the gas into the liquid. As the gas is injected, the pressure rises until a pressure relief valve opens to vent the excess gas. These devices do not generally have any provisions to dispense the beverage while maintaining the vessel pressure. Instead it is necessary to the remove the vessel containing the beverage from the carbonation device to access the beverage. The disadvantage of this is that the carbonated beverage must be used quickly or the beverage will lose carbonation. Another major disadvantage of the vent valve being exposed to the vessel and its contents is that if the vessel is over filled, or filled with a liquid that tends to foam easily (for instance a premixed soda or soft drink), the liquid may be drawn into the vent mechanism, causing unwanted release of the beverage and possibly damage to the vent mechanism.

Configurations of the disclosed technology address shortcomings in the prior art.

DETAILED DESCRIPTION

As described herein, aspects are directed to a portable system and methods for carbonating, storing, and dispensing a beverage. Configurations of the described technology allow the user to infuse a beverage with a gas at a controlled pressure setpoint, then dispense the beverage either automatically by the drinking action of the user, or by manual actuation of a dispensing valve. Certain configurations also incorporate a pressure relief feature that vents the gas at a safe pressure for the vessel and equipment.

There are several benefits of example configurations disclosed here. By actively controlling the pressure within the vessel, there is no danger of over-pressurizing the vessel from the user overfilling the vessel with liquid. The vent mechanism may be built into the gas circuit and thus protected from the beverage by a one-way valve between the gas pressurization system and the beverage delivery mechanism. This allows the user to gas-infuse beverages that would otherwise cause foaming and clogging of the vent mechanism in other carbonation machines.

Example configurations include a beverage dispensing mechanism that may be actuated by two methods. The first method is by the user applying a slight negative pressure to a control diaphragm, which opens the valve sealing the high-pressure beverage from the ambient environment. This slight negative pressure is similar to what is needed to drink a normal beverage through a straw. The second method is by the user depressing a button that forces the control diaphragm and valve downward, opening the valve that seals the high-pressure beverage from the ambient environment and allowing the beverage to flow from the straw without requiring the user to suck on the straw. The advantage of this configuration over the state of the art is that it allows the user to drink from the device in an intuitive way and directly from the same container in which the beverage is infused with gas rather than having to pour the infused beverage from the infusion vessel into a separate drinking vessel for consumption.

Figure 1:
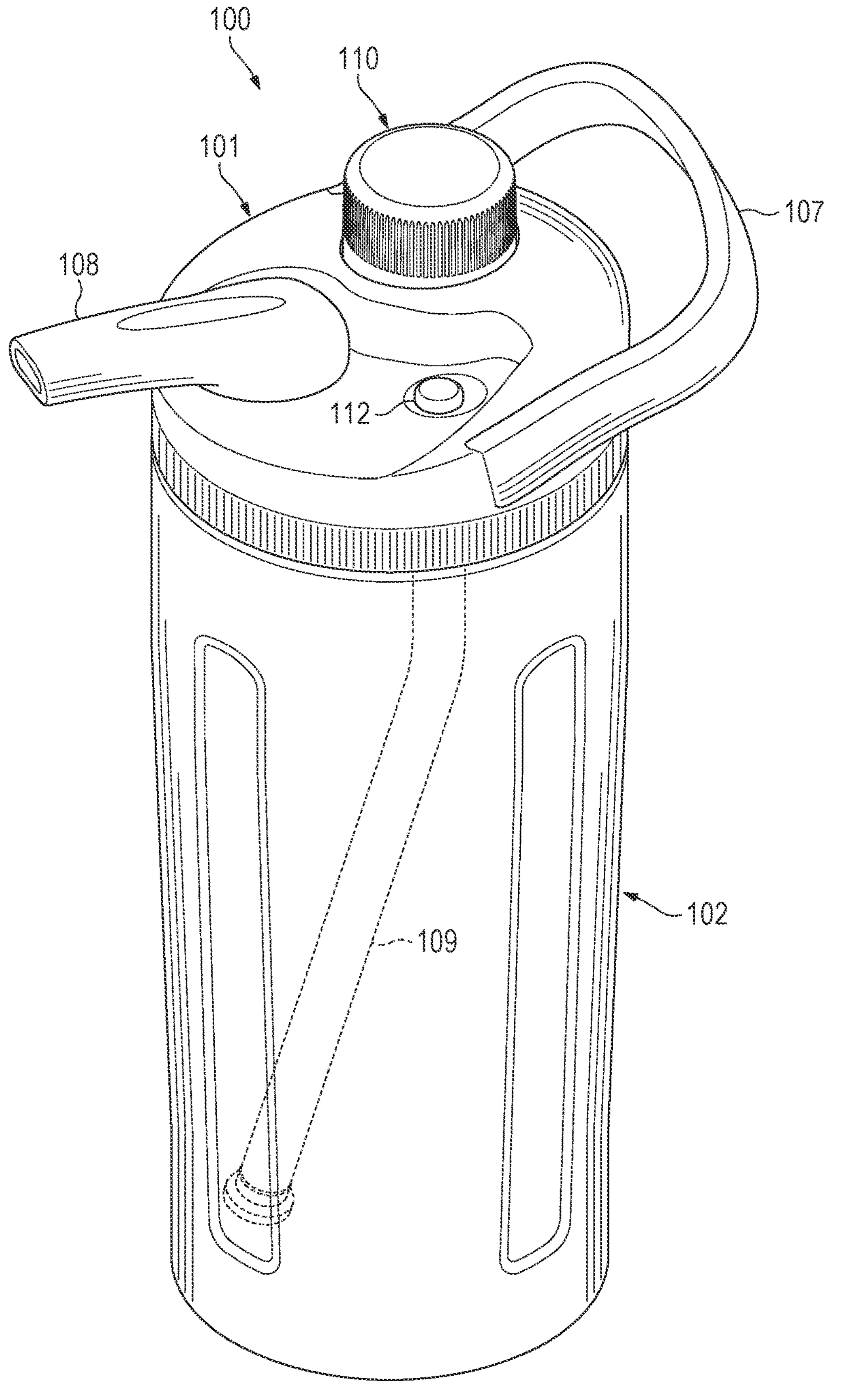
FIG. 1 is a front, perspective view of a pressurized beverage dispenser, according to an example configuration, illustrating an example cap and beverage container.
Figure 2:
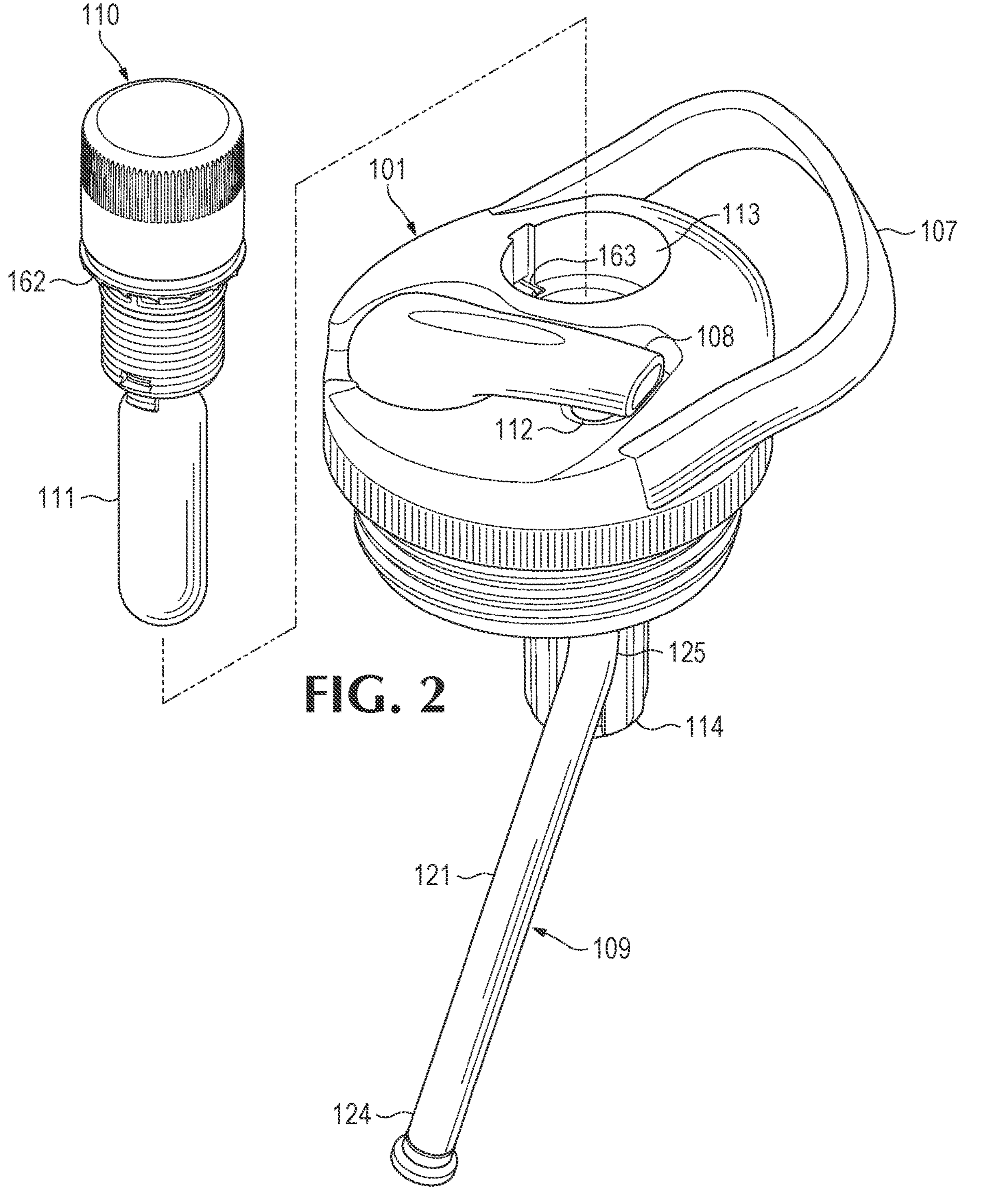
FIG. 2 is a partially exploded view of the cap of FIG. 1, illustrating an example pressure regulator and compressed-gas cartridge.
Figure 3:
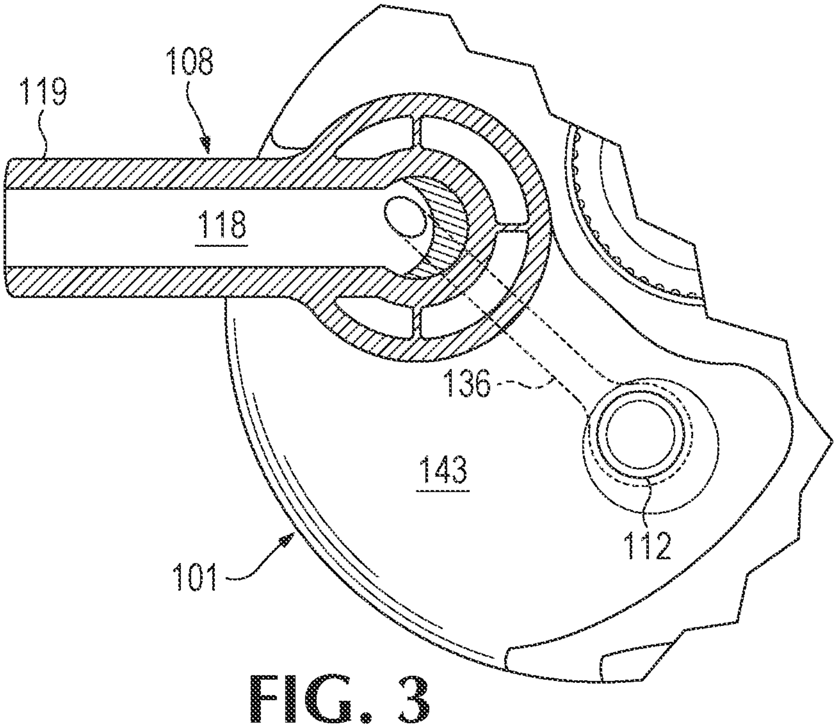
FIG. 3 is a partial top view of the cap of FIG. 1, illustrating the external straw in cutaway to show further details, and showing the external straw in an example of a dispensing position.
Figure 4:
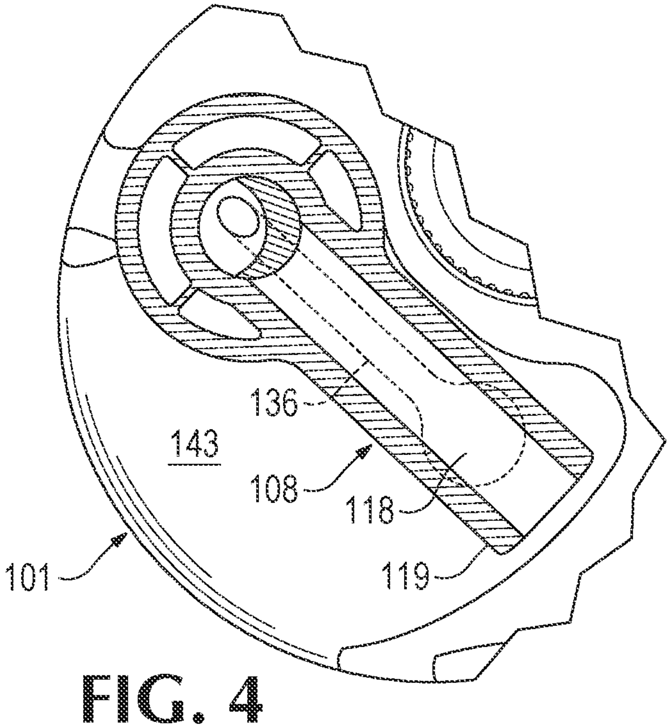
FIG. 4 is a partial top view of the cap of FIG. 1, illustrating the external straw in cutaway to show further details, and showing the external straw in an example of a closed position.

FIG. 1 is a front, perspective view of a pressurized beverage dispenser 100, according to an example configuration. FIG. 2 is a partially exploded view of the cap 101 of FIG. 1, illustrating an example pressure regulator 110 and compressed-gas cartridge 111. FIG. 3 is a partial top view of the cap 101 of FIG. 1, illustrating the external straw 108 in cutaway to show internal details, and showing the external straw 108 in an example of a dispensing position. FIG. 4 is a partial top view of the cap 101 of FIG. 1, illustrating the external straw 108 in cutaway to show internal details, and showing the external straw 108 in an example of a closed position.

As illustrated in FIGS. 1-4, a pressurized beverage dispenser 100 may include a cap 101 and a beverage container 102. In configurations, the pressurized beverage dispenser 100 is portable. As used in this disclosure, the term "portable" means that the pressurized beverage dispenser 100 may be easily carried by hand. The cap 101 may be installed or removed from the beverage container 102 by, for example, threading the cap 101 into the beverage container 102 or otherwise using known methods for attaching a removable lid to a beverage bottle.

The beverage container 102 may be a pressure vessel capable of containing pressure sufficient for gas infusion of a beverage within the beverage container 102. The beverage container 102 may be insulated by means of a vacuum being maintained between an inner wall 103 and an outer wall 104 (FIG. 9) of the beverage container 102. In configurations, the space between the inner wall 103 and the outer wall 104 may be filled with air, expanded foam, or other thermal insulating materials. The insulating means allow the pressurized beverage dispenser 100 to maintain the beverage below ambient temperature for extended periods, which is useful for using pressurized beverage dispenser 100 as a serving device.

In use, the beverage container 102 is generally partially filled with a liquid beverage, leaving nominal headspace between the surface of the beverage and the underside of the cap 101 (when installed) to allow for sufficient mixing and agitation when the device is shaken to promote gas infusion. In example configurations, the liquid beverage may constitute between about 70% and about 90% of the interior volume 105 of the beverage container 102 (FIG. 9), with the remainder being headspace and to accommodate the enclosure 114.

The cap 101 may include a cap body 106, a handle 107, an external straw 108, an internal straw 109, a pressure regulator 110, a compressed-gas cartridge 111, and an actuator 112. The actuator 112 is on the cap body 106 and is further explained below in the discussion of FIG. 9.

The pressure regulator 110 is configured to maintain a desired pressure inside the beverage container 102. The desired pressure may be, for example, between 30 and 45 PSI for gas infusion of a beverage within the beverage container 102, though other pressure ranges may be used in other configurations. A portion of the pressure regulator 110 pierces the compressed-gas cartridge 111 when the pressure regulator 110 is installed into the cap body 106, as further explained below for FIG. 9.

As illustrated in FIG. 2, the compressed-gas cartridge 111 may be inserted into a pressure chamber 113 of the cap body 106 and be received by an enclosure 114. The pressure regulator 110 may be secured within the pressure chamber 113, such as by threading the pressure regulator 110 into the cap body 106. As the pressure regulator 110 is installed, a piercing element 115 (FIG. 9) punctures the compressed-gas cartridge 111. Once punctured, the seal 168 substantially precludes the flow of gas from the compressed-gas cartridge 111 other than into the high-pressure cavity 148 (which is discussed further below). In configurations, the pressure regulator 110 may be removed from the cap body 106 by twisting the pressure regulator 110 in a first rotative direction 116 relative to the cap body 106. For example, in configurations where the pressure regulator 110 is threaded into the cap body 106, the pressure regulator 110 may be removed from the cap body 106 by twisting the pressure regulator 110 in a counterclockwise direction, the direction to unthread the pressure regulator 110 from the cap body 106.

The compressed-gas cartridge 111 is a reservoir of gas under pressure. The gas may be, for example, carbon dioxide, nitrogen, or nitrous oxide, though other gasses or combinations of gasses, such as a mixture of carbon dioxide and nitrogen may be used in configurations.

In configurations, the cap 101 may further include a secondary relief valve 117 configured to vent excess pressure from the pressure chamber 113. Excess pressure may result from, for example, an uncontrolled release of gas from the compressed-gas cartridge 111.

The external straw 108 extends from the cap body 106 and has an internal passageway 118 for delivering a beverage to an outlet end 119 of the external straw 108. In configurations, the external straw 108 is configured to be positioned in a closed position, which substantially blocks user access to the actuator 112. As used in this disclosure, "substantially blocks" means largely or essentially obstructs, without requiring a perfect barricade to all access. An example of the closed position is shown in FIG. 2. The closed position also may act as a safety feature to avoid inadvertent dispensing of the beverage.

In configurations, the external straw 108 is configured to be positioned in a dispensing position, which allows user access to the actuator 112. An example of the dispensing position is shown in FIG. 1. In configurations, such as the configuration illustrated in FIGS. 3 and 4, the external straw 108 is pivotably connected to the cap body 106, and the external straw 108 is configured to rotate between the dispensing position (FIG. 3) and the closed position (FIG. 4).

The internal straw 109 extends from an underside 120 of the cap body 106 and is configured to provide a conduit or passageway for beverage from the beverage container 102. The internal straw 109 is tightly sealed to the cap body 106 to allow the beverage to be pushed through the straw by pressure within the beverage container 102.

Figure 5:
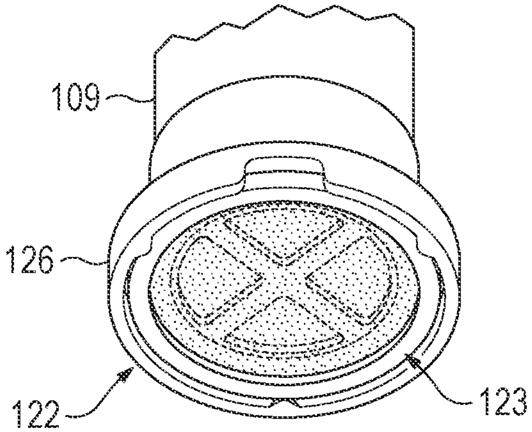
FIG. 5 is a perspective view of an inlet end of the internal straw of the cap of FIG. 2.
Figure 6:
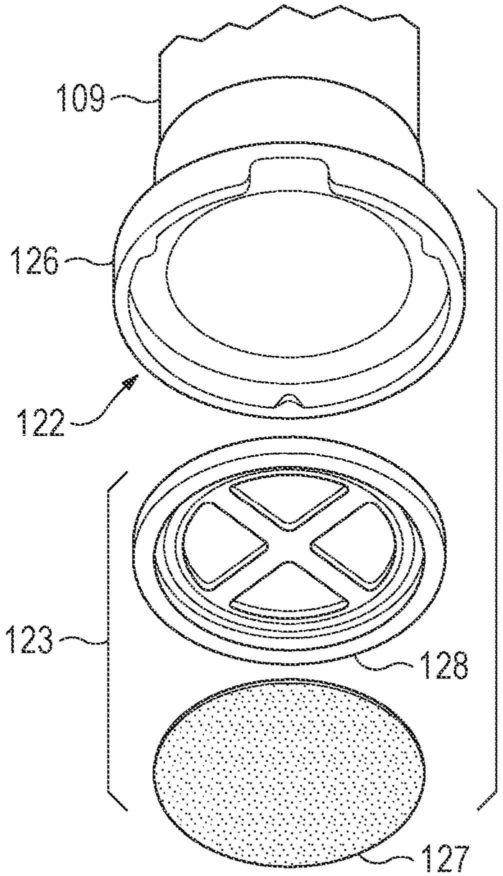
FIG. 6 is an exploded view of the portion of the internal straw illustrated in FIG. 3.
Figure 7:
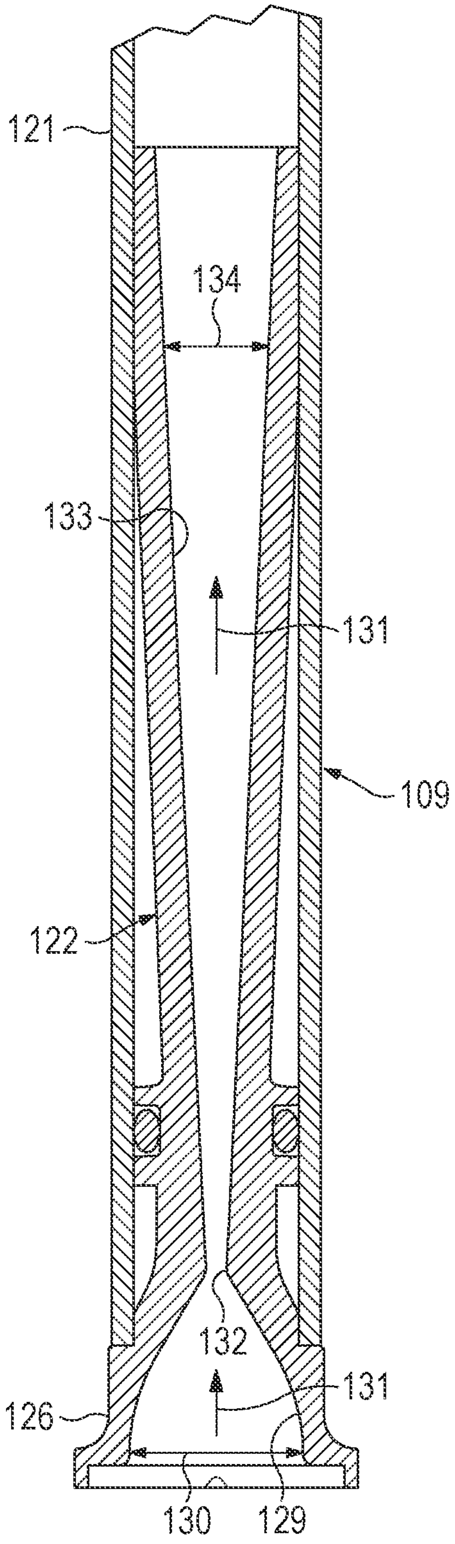
FIG. 7 is a cross-sectional view of the inlet end of the internal straw illustrated in FIG. 3.

FIG. 5 is a perspective view of an end of the internal straw 109 of the cap 101 of FIG. 2. FIG. 6 is an exploded view of the portion of the internal straw 109 illustrated in FIG. 5. FIG. 7 is a cross-sectional view of the end of the internal straw 109 illustrated in FIG. 5. As illustrated in FIGS. 2 and 5-7, the internal straw 109 may include a tubular portion 121, a flow restrictor 122 within the tubular portion 121, and a filter 123.

Figure 9:
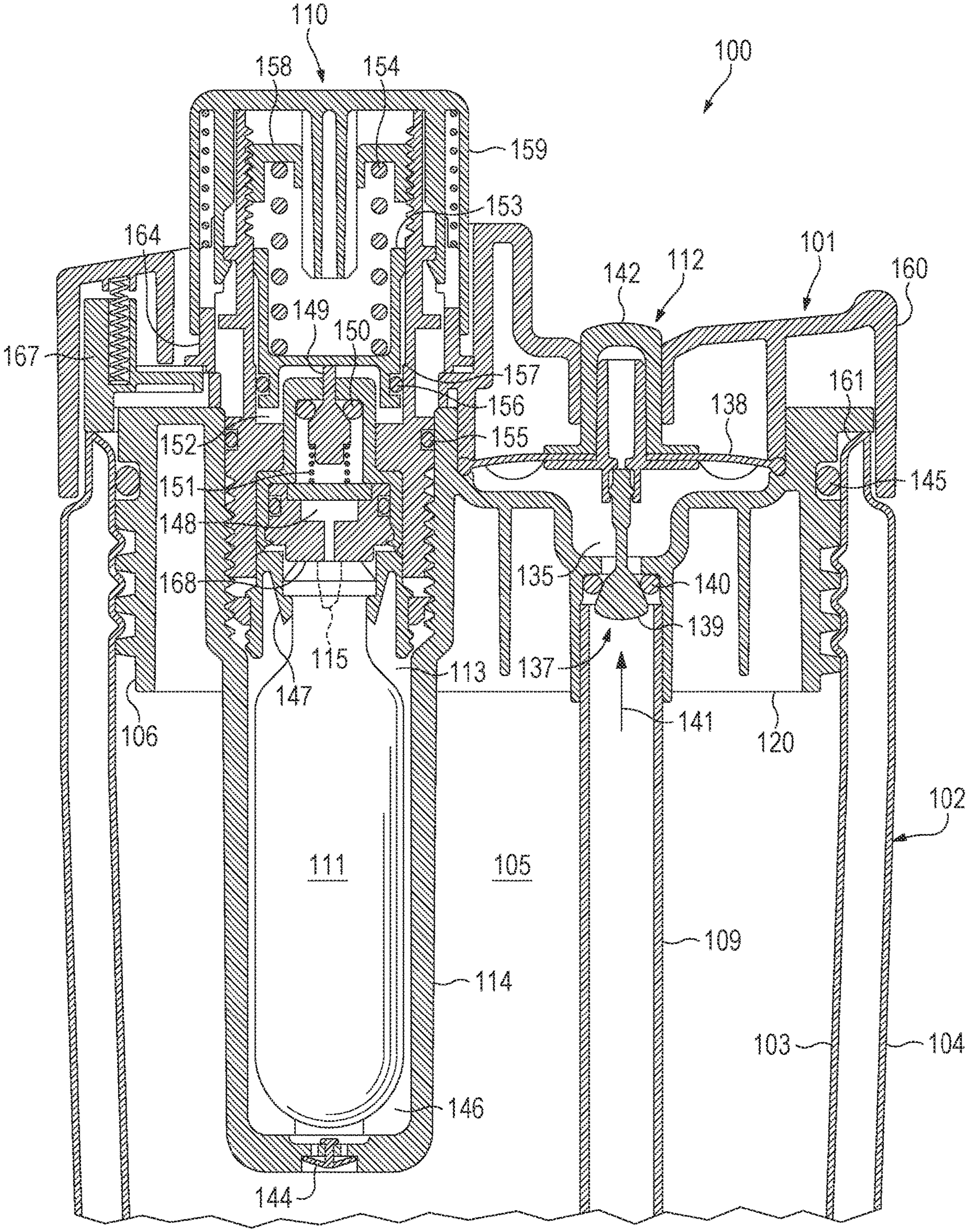
FIG. 9 is a cutaway, as defined in FIG. 8, of a portion of the pressurized beverage dispenser of FIG. 1.

In configurations, the tubular portion 121 of the internal straw 109 may have an inlet end 124 and an outlet end 125 (FIG. 9), and the flow restrictor 122 may be at the inlet end 124 of the tubular portion 121. The outlet end 125 of the tubular portion 121 may be coupled to the cap body 106, for example as shown in FIG. 9.

As best shown in FIG. 6, the filter 123 may be at an inlet end 126 of the flow restrictor 122. The filter 123 may include a filter element 127 and a filter holder 128. The filter holder 128 is configured to accept and hold the filter 123. In configurations, the filter holder 128 is further configured to be received within the inlet end 126 of the flow restrictor 122. The filter 123 is configured to keep debris out of the internal straw 109. Accordingly, the internal straw 109 may be used with, for example, citrus fruit that may have seeds or large pieces of pulp that may clog dispensing elements in the cap 101 if not filtered out.

The flow restrictor 122 has a converging portion 129, which has an inner diameter 130 that, in configurations, smoothly tapers in a direction 131 of flow to a throat 132 of the flow restrictor 122. As used in this disclosure, "smoothly" means that the inner diameter has a continuous, even surface that is largely or essentially free from projections or unevenness. The flow restrictor 122 further has a diverging portion 133, which has an inner diameter 134 that smoothly increases in the direction 131 of flow from the throat 132. In configurations, the rate of increase of the inner diameter 134 of the diverging portion 133 is at least half the rate of decrease of the inner diameter 130 of the converging portion 129, in each case in the direction 131 of flow.

In configurations, the pressure drop across the throat 132 of the flow restrictor 122 is greater than the pressure drop across any other element in the flow path of beverage from the interior volume 105 of the beverage container 102 to the outlet end 119 of the external straw 108, especially, the metering valve 137 (which is explained below in the discussion of FIG. 9). Indeed, this aspect is important for reducing foaming when dispensing a beverage under pressure, especially a carbonated beverage. In particular, the flow restrictor 122 provides the greatest pressure drop along the flow path (which controls the flow rate of beverage through the pressurized beverage dispenser 100) to occur in a laminar fashion due to the gradual reduction in cross-sectional area of the converging portion 129 and the gradual increase in cross-sectional area of the diverging portion 133. In the illustrated configuration, the flow path is the flow of beverage from the interior volume 105 of the beverage container 102, through the filter 123, through the flow restrictor 122, through the remainder of the internal straw 109, past the metering valve 137, into the discharge chamber 135, through the discharge channel 136, and out the outlet end 119 of the external straw 108.

Preferably, the throat 132 is sized to produce a flow rate between about 0.4 L/min (liters per minute) and about 2.0 L/min at about 30 PSI within the interior volume 105 of the beverage container 102. More preferably, the throat 132 is sized to produce a flow rate between about 0.8 L/min and about 1.6 L/min at about 30 PSI within the interior volume 105 of the beverage container 102. Even more preferably, the throat 132 is sized to produce a flow rate of about 1.2 L/min (liters per minute) at about 30 PSI within the interior volume 105 of the beverage container 102.

Figure 8:
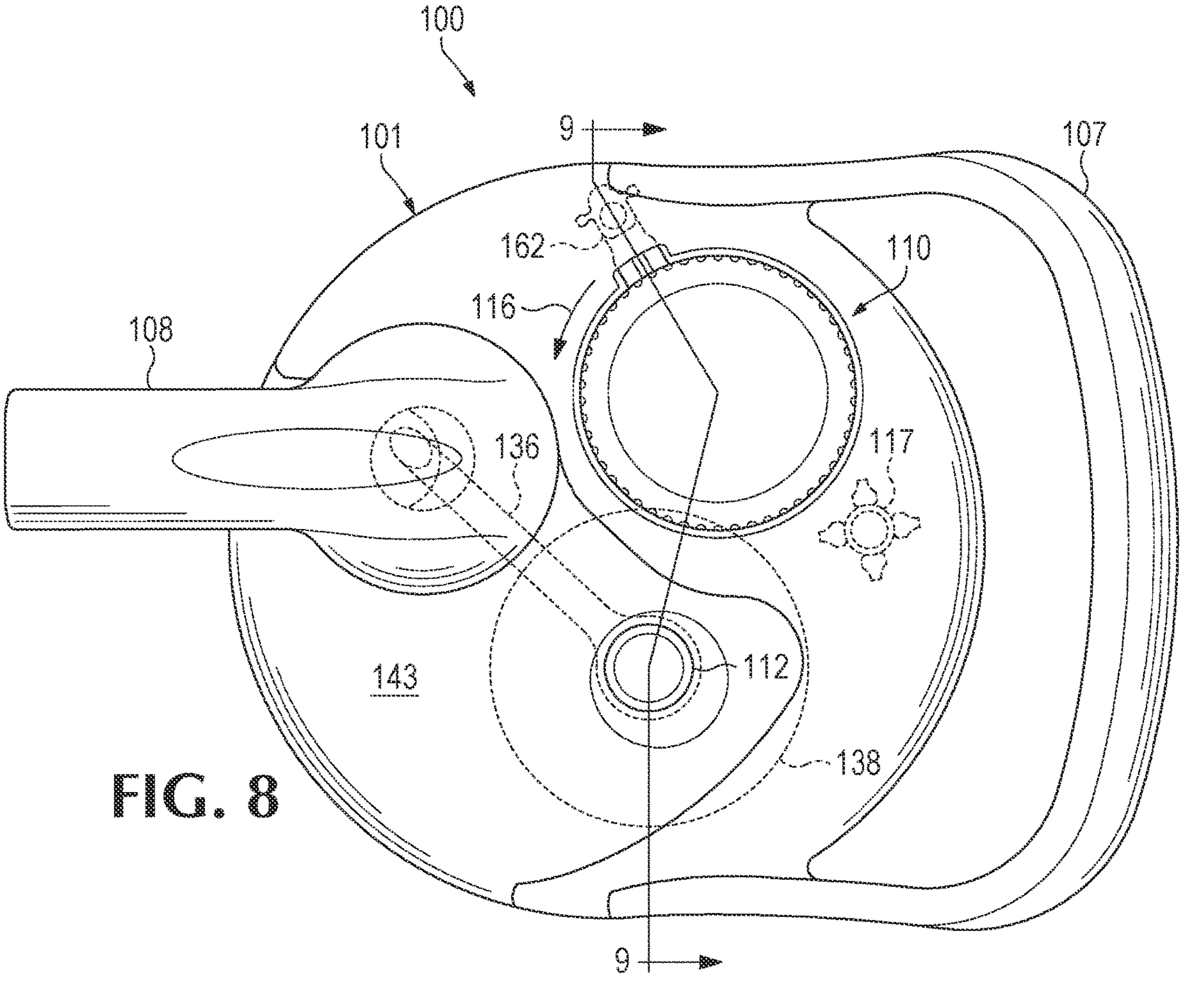
FIG. 8 is a top view of the pressurized beverage dispenser of FIG. 1.
Figure 11:
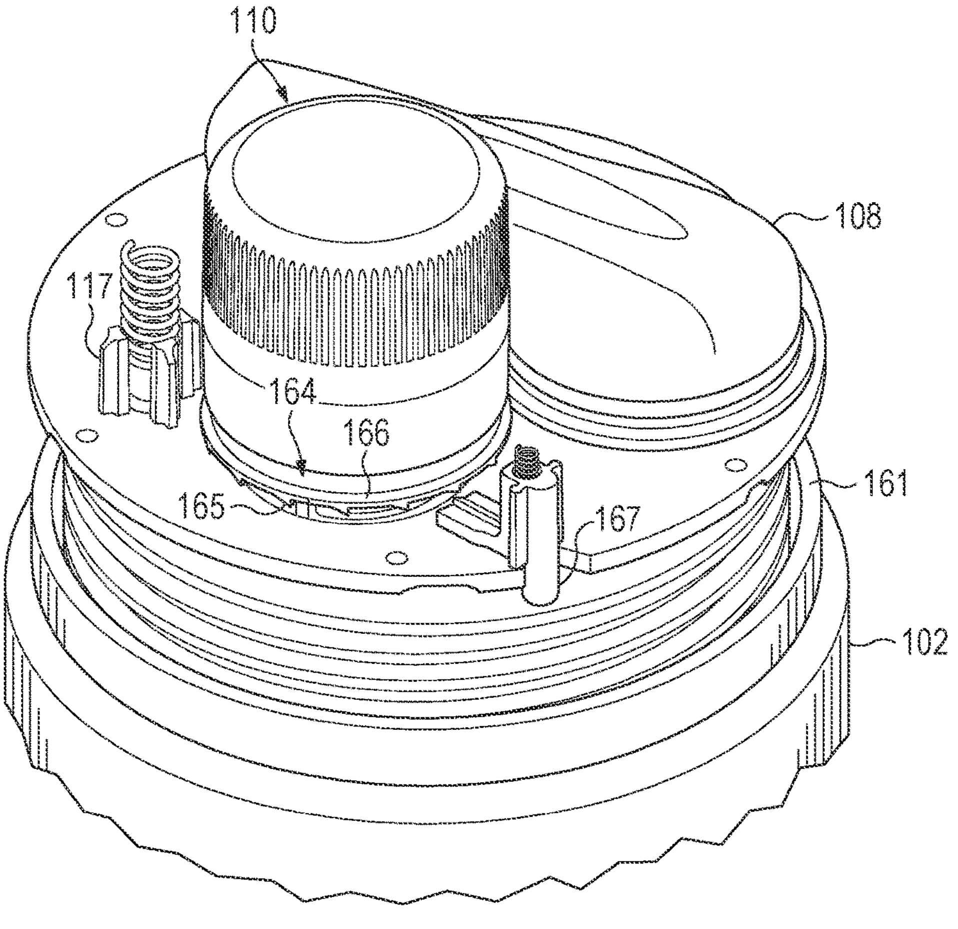
FIG. 11 is a rear, perspective view of the pressurized beverage dispenser of FIG. 1, with a portion of the top covering of the cap removed to show other details, including an example of a lock actuator disengaged from the rim of the beverage container.

FIG. 8 is a top view of the cap 101 of FIG. 1. FIG. 9 is a cutaway, as defined in FIG. 8, of a portion of the pressurized beverage dispenser 100 of FIG. 1. As illustrated in FIG. 11, the pressurized beverage dispenser 100 may include the cap body 106 and the external straw 108, each as described above, as well as a discharge chamber 135, a discharge channel 136, a metering valve 137, a diaphragm 138, the actuator 112, and the enclosure 114.

The discharge chamber 135 is within the cap body 106. In configurations, the discharge chamber 135 is bounded in part by the diaphragm 138. The discharge channel 136 is within the cap body 106 and connects the discharge chamber 135 to the internal passageway 118 of the external straw 108. The discharge channel 136 provides fluid communication between the discharge chamber 135 and the internal passageway 118.

The metering valve 137 is configured to allow flow of beverage into the discharge chamber 135 when the metering valve 137 is open and to substantially preclude the flow of beverage into the discharge chamber 135 when the metering valve 137 is closed. As used in this disclosure, substantially preclude means largely or essentially preventing, without eliminating all possibility.

In typical use, the metering valve 137 is biased closed due to a small force imparted to the metering valve 137 by the diaphragm 138. In addition, pressure within the beverage container 102 (when the cap 101 is installed on the beverage container 102 and the beverage container 102 is pressurized by action of the pressure regulator 110) applies a force to keep the metering valve 137 closed. Those forces (from the diaphragm 138 and from the pressure within the beverage container 102) may be overcome, and the metering valve 137 may be opened, by action of the diaphragm 138 as explained below.

In configurations, the metering valve 137 may include a valve member 139 and a valve seat 140. The valve member 139 is a moving component configured to seat and unseat from the valve seat 140 during typical operation of the metering valve 137. The valve member 139 is unseated from the valve seat 140 when the metering valve 137 is open, and the valve member 139 is seated against the valve seat 140 when the metering valve 137 is closed. The valve seat 140 is downstream of the valve member 139 in a direction 141 of beverage flow through the metering valve 137. Accordingly, the valve member 139 moves in the upstream direction (opposite the direction 141 of beverage flow through the metering valve 137) to unseat from the valve seat 140. This example configuration helps the pressure within the beverage container 102 to keep the metering valve 137 closed.

The diaphragm 138 is configured to open the metering valve 137 when the diaphragm 138 is activated and to close the metering valve 137 when the diaphragm 138 is deactivated. The diaphragm 138 is further configured to activate when a user sucks on the outlet end 119 of the external straw 108, creating suction within the discharge chamber 135. When the diaphragm 138 is activated, the volume of the discharge chamber 135 is decreased (relative to its volume when the diaphragm 138 is deactivated) and, when the diaphragm 138 is deactivated, the volume of the discharge chamber 135 is increased (relative to its volume when the diaphragm 138 is activated).

In configurations, the diaphragm 138 is configured to deflect an amount toward the metering valve 137 and into the discharge chamber 135 before the diaphragm 138 opens the metering valve 137 and to deflect an amount away from the metering valve 137 after the diaphragm 138 closes the metering valve 137. Such a configuration creates suction within the discharge chamber 135 to suck beverage back through the external straw 108 and into the discharge chamber 135 to help prevent the beverage from leaking out of the external straw 108 after the user is finished drinking from the external straw 108.

The diaphragm 138 has several attributes that, in example configurations, may contribute to a robust seal of the metering valve 137, preventing the flow of beverage past the metering valve 137 except when the valve is deliberately opened. These attributes include (a) the ratio of the working area of the diaphragm 138 versus that of the metering valve 137, which determines the mechanical advantage of the suction the user can generate against the pressure in the beverage container 102 that tends to keep the metering valve 137 closed, but still having sufficient fluid flow area through the metering valve 137 and a diaphragm 138 area that fits within the available space in the cap 101; (b) the diaphragm 138 preload, which should be high enough to keep the metering valve 137 firmly closed against gravity in the absence of internal vessel pressure while still being low enough to allow the user to use a comfortable level of suction to open the valve; and (c) the restoring force curve (spring rate) of the diaphragm 138 when installed, which must be sufficiently high to produce the necessary preload, yet low enough to allow movement at sufficiently low suction pressure for a comfortable user experience. The diaphragm 138 illustrated in FIG. 9 uses its shape, which is slightly domed as shown, to create this spring force.

The actuator 112 is on the cap body 106 and coupled to the diaphragm 138. The actuator 112 is configured to activate the diaphragm 138 when the user manually engages the actuator 112, without requiring the user to also create suction within the discharge chamber 135 by sucking on the outlet end 119 of the external straw 108.

In configurations, the actuator 112 may be or include an actuator button 142 on an upper side 143 of the cap body 106. The actuator button 142 is configured to activate the diaphragm 138 when the user depresses the actuator button 142. In configurations having the actuator button 142 and in which the external straw 108 is pivotably connected to the upper side 143 of the cap body 106, the external straw 108 substantially blocks user access to the actuator button 142 in the closed position of the external straw 108, and the external straw 108 allows user access to the actuator button 142 in the dispensing position of the external straw 108.

The enclosure 114 is configured to substantially surround the compressed-gas cartridge 111. In this context, "substantially surround" means that the enclosure 114 largely or essentially extends around the compressed-gas cartridge 111, such that the enclosure 114 would prevent the compressed-gas cartridge 111 from contacting any beverage within the beverage container 102. In configurations, the enclosure 114 has a one-way valve 144 configured to vent pressurized gas from a region 146 within the enclosure 114 to a region 105 outside of the enclosure 114. The region outside of the enclosure 114 corresponds to the interior volume 105 of the beverage container 102 when the cap 101 is installed on the beverage container 102. Accordingly, the one-way valve 144 is configured to provide pressurized gas into the interior volume 105 of the beverage container 102 when the cap 101 is installed on the beverage container 102. The one-way valve 144 is further configured to substantially preclude beverage that is within the interior volume 105 of the beverage container 102 from entering the enclosure 114.

A main seal 145 provides a seal between the inner wall 103 of the beverage container 102 and the cap body 106, when the cap 101 is installed onto the beverage container 102.

During use, the piercing element 115 pierces the compressed-gas cartridge 111 and a cartridge seal 147 seals high-pressure gas from the compressed-gas cartridge 111 inside a high-pressure cavity 148. A metering pin 149 is held against a regulator valve seat 150 by the force of a pin spring 151 and the force of the pressure differential between the high-pressure cavity 148 and a low-pressure cavity 152, prohibiting the flow of gas. When the force of pressure from the low-pressure cavity 152 on a piston 153 is less than the force from compression of a main spring 154, the piston 153 is allowed to move downward until it depresses the metering pin 149, which separates the metering pin 149 from the regulator valve seat 150, allowing gas to flow from the high-pressure cavity 148 to the low-pressure cavity 152.

When the pressure in the low-pressure cavity 152 is at the desired pressure, it acts on the piston 153 to compress the main spring 154 and move the piston 153 upward, allowing the metering pin 149 to contact the regulator valve seat 150 and stop the gas flow from the high-pressure cavity 148 to the low-pressure cavity 152. Gas from the low-pressure cavity 152 exits the pressure regulator 110 through passages to an area below the low-pressure seal 155, where it flows into the interior volume 105 of the beverage container 102 through an interior cavity 146 of the enclosure 114. If the pressure in the low-pressure cavity 152 continues to rise, the additional pressure will continue to force the piston 153 upward against the force of the main spring 154. If the pressure in the low-pressure cavity 152 continues to rise, the piston 153 will continue to move upward until the piston seal 156 rises above the piston-seal shelf 157, allowing gas from the low-pressure cavity 152 to escape into the ambient environment. This is a safety feature that prevents excessive pressure from building up in the beverage container 102.

Because the one-way valve 144 prohibits the backflow of contents from the interior volume 105 of the beverage container 102 into the pressure regulator 110, while simultaneously stopping unwanted pressure excursions within the interior volume 105 of the beverage container 102, it is important to protect both the components of the pressure regulator 110 from the contents of the beverage container 102 because of the sticky nature of many beverages when they dry, which may lead to improper function of the components. This improper function, in turn, may lead to unwanted and possibly unsafe behavior of the pressure regulator 110. For this reason, the functional location of the one-way valve 144 is important to sustained proper function of the device.

Threaded spring hat 158 compresses the main spring 154 to the desired static force. This force can be varied during assembly to achieve the desired output pressure of the pressure regulator 110. Handgrip 159 allows the pressure regulator 110 to be twisted or threaded into position within the cap body 106.

Figure 10:
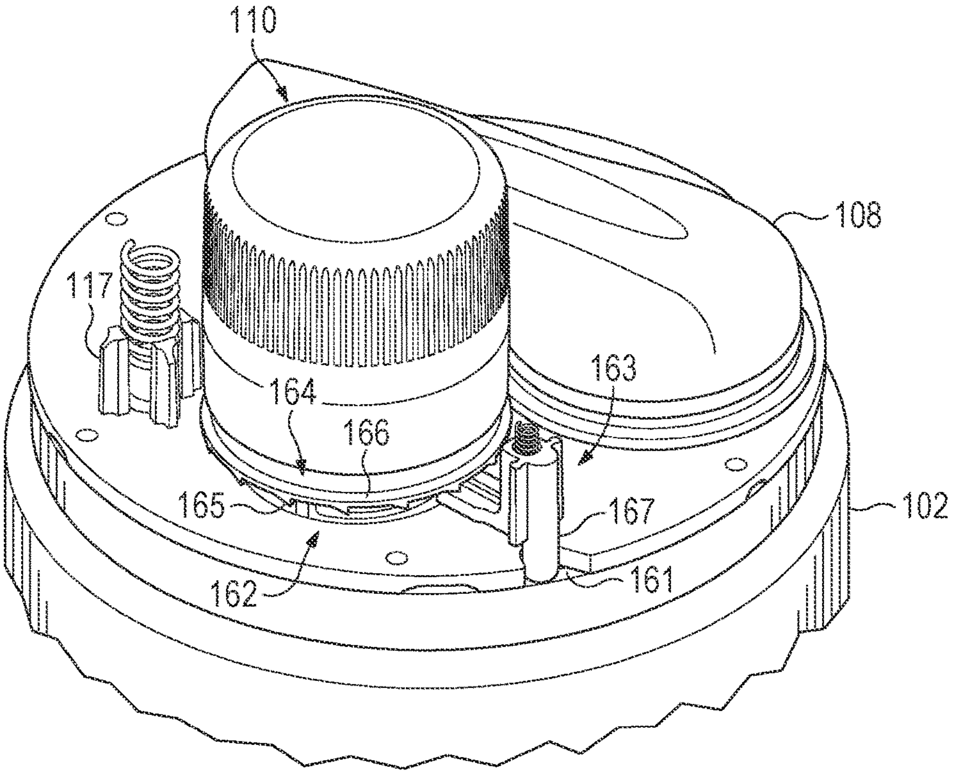
FIG. 10 is a rear, perspective view of the pressurized beverage dispenser of FIG. 1, with a portion of the top covering of the cap removed to show other details, including an example of a lock actuator engaging the rim of the beverage container on which the cap is installed.

FIG. 10 is a rear, perspective view of the pressurized beverage dispenser 100 of FIG. 1, with a top covering 160 of the cap 101 removed to show an example of a lock actuator 163 engaging the rim 161 of the beverage container 102 on which the cap 101 is installed. FIG. 11 is a rear, perspective view of the pressurized beverage dispenser 100 of FIG. 1, with a portion of the top covering 160 of the cap 101 removed to show an example of a lock actuator 163 disengaged from the rim 161 of the beverage container 102. As illustrated in FIGS. 10 and 11, the pressurized beverage dispenser 100 may include the cap 101, the beverage container 102, and the pressure regulator 110, each as described above. In addition, the cap 101 may include a secondary relief valve 117, a locking component 162, and a lock actuator 163.

The function of the secondary relief valve 117 is to provide emergency pressure relief in the event of a pressure rise that is too fast for the pressure relief mechanism within the regulator to relieve, or if the pressure relief mechanism within the regulator has been rendered inoperable. The relief pressure setting of the secondary relief valve 117 is set to be above that of the relief pressure of the regulator vent mechanism, but below the maximum safe operating pressure of the bottle and cap, between approximately 65 and 85 PSI.

The locking component 162 is coupled to the pressure regulator 110. In configurations, the locking component 162 includes a locking ring 164 that is coupled to the pressure regulator 110. In configurations, the locking ring 164 has a series of projections, or teeth 165, extending away from a main portion 166 of the locking ring 164.

The lock actuator 163 is coupled to the cap body 106 and configured to mechanically engage the locking component 162 to prevent rotation of the pressure regulator 110 in the first rotative direction 116 when the cap 101 is installed on the beverage container 102. The lock actuator 163 is also configured to disengage from the locking component 162 and allow rotation of the pressure regulator 110 in the first rotative direction 116 when the cap 101 is not installed on the beverage container 102. Accordingly, the pressure regulator 110 may not be removed from the cap 101 when the cap 101 is installed on the beverage container 102, and the pressure regulator 110 may be removed from the cap 101 when the cap 101 is not installed on the beverage container 102. This may prevent the user from inadvertently breaking the seal between the compressed-gas cartridge 111 and the pressure regulator 110, which might cause an uncontrolled release of high pressure gas into the beverage container 102.

In configurations where the locking ring 164 includes the series of teeth 165, the lock actuator 163 is configured to engage one or more of the series of teeth 165 of the locking ring 164 to prevent rotation of the pressure regulator 110 in the first rotative direction 116 when the cap 101 is installed on the beverage container 102. The lock actuator 163 is also configured to disengage from the series of teeth 165 of the locking ring 164 and allow rotation of the pressure regulator 110 in the first rotative direction 116 when the cap 101 is not installed on a beverage container 102.

In configurations, the lock actuator 163 comprises an actuator pin 167 extending through an underside 120 of the cap body 106, the actuator pin 167 configured to engage a rim 161 of a beverage container 102 when the cap 101 is installed on the beverage container 102, the actuator pin 167 configured to be pushed by the rim 161 of the beverage container 102 in a direction away from the rim 161 of the beverage container 102 when the cap 101 is installed on the beverage container 102.

With reference to FIGS. 1-11, a first example aspect is a system to infuse a beverage with a gas and dispense it:

The user fills the interior volume 105 of the beverage container 102 to a predetermined level with a beverage to be infused with gas. The user installs the cap 101 by, for example, screwing the cap 101 down until the main seal 145 is securely sealed to the inner wall 103 of the beverage container 102. The user installs a compressed-gas cartridge 111 into the enclosure 114. The user installs the pressure regulator 110 into the enclosure 114 until the low-pressure seal 155 is sealed against the enclosure 114, the cartridge seal 147 is sealed against the compressed-gas cartridge 111, and the piercing element 115 has broken the top of the compressed-gas cartridge 111 so that the high-pressure gas within the compressed-gas cartridge 111 is accessed. The pressure regulator 110 allows gas to flow into the interior volume 105 of the beverage container 102 until the preset pressure is reached. The user agitates the pressurized beverage dispenser 100 and its contents to promote gas infusion.

After agitation, the user makes the beverage dispenser ready for dispensing by moving the external straw 108 to the dispensing position. The user may then dispense the beverage by two example methods:

In the first example method, the user sucks on the external straw 108. This causes a pressure differential between the discharge channel 136 and the ambient environment. This pressure differential acts on the diaphragm 138 and creates a force that moves the valve member 139 away from the valve seat 140 against the pressure within the interior volume 105 of the beverage container 102. This allows beverage to flow up the internal straw 109, past the gap between the valve member 139 and the valve seat 140, and through the discharge channel 136, into the external straw 108 and to the user.

When the user wishes to stop the flow of liquid, they stop sucking against the external straw 108. This removes the pressure differential on the diaphragm 138, which allows the internal pressure within the interior volume 105 of the beverage container 102 to push the valve member 139 against the valve seat 140. This stops the flow of liquid in the device.

In the second example method, the user pushes down on the actuator button 142. This manually forces the valve member 139 away from the valve seat 140 against the pressure within the interior volume 105 of the beverage container 102. This allows beverage to flow up the internal straw 109, through the gap between the valve member 139 and the valve seat 140, through the discharge channel 136, and into the external straw 108 and to the user.

When the user wishes to stop the flow of liquid, they stop pushing down on the actuator button 142. This allows the internal pressure within the interior volume 105 of the beverage container 102 to push the valve member 139 against the valve seat 140. This stops the flow of liquid in the device.

When the user wishes, they may swivel the external straw 108 over the top of the cap 101. The shape and placement of the external straw 108 and actuator button 142 on the cap 101 is such that, when the external straw 108 is in the fully stowed position, it is mechanically held in position against inadvertent movement and physically blocks access to the actuator button 142. This makes the device ready to stow and transport, without worry of inadvertently actuating the device to dispense.

With continued reference to FIGS. 1-11, a second example aspect is a system to preserve a beverage with a gas and dispense it:

The user fills the interior volume 105 of the beverage container 102 to a predetermined level with a beverage. The user installs the cap 101 by screwing the cap 101 down until the main seal 145 is securely sealed to the inner wall 103 of the beverage container 102. The user installs a compressed-gas cartridge 111 into the enclosure 114. In this case, the cartridge may be filled with CO2, or for non-carbonated drinks, another inert gas such as argon, nitrogen, or NO2. The user installs the pressure regulator 110 into the cartridge receptacle until the low-pressure seal 155 is sealed against the enclosure 114, the cartridge seal 147 is sealed against the compressed-gas cartridge 111, and the piercing element 115 has broken the top of the compressed-gas cartridge 111 so that the high pressure gas within the compressed-gas cartridge 111 is accessed.

The pressure regulator 110 allows gas to flow into the interior volume 105 of the beverage container 102 until the preset pressure is reached. In this example aspect, the pressure is set to a lower value, typically between one and five PSI for non-carbonated beverages, and between five and fifteen PSI for carbonated beverages. The user may then dispense the beverage by two example methods:

In the first example method, the user sucks on the external straw 108. This causes a pressure differential between the discharge channel 136 and the ambient environment. This pressure differential acting on the diaphragm 138 creates a force that moves the valve member 139 away from the valve seat 140 against the pressure within the interior volume 105 of the beverage container 102. This allows beverage to flow up the internal straw 109, past the gap between the valve member 139, and the valve seat 140 and through the discharge channel 136, into the external straw 108 and to the user.

When the user wishes to stop the flow of liquid, they stop sucking against the external straw 108. This removes the pressure differential on the diaphragm 138, which allows the internal pressure within the interior volume 105 of the beverage container 102 to push the valve member 139 against the valve seat 140. This stops the flow of liquid from the device.

In the second example method, the user pushes down on the actuator button 142. This pushing action manually forces the valve member 139 away from the valve seat 140 against the pressure within the interior volume 105 of the beverage container 102. This allows beverage to flow up the internal straw 109, past the gap between the valve member 139 and the valve seat 140, and through the discharge channel 136, into the external straw 108 and to the user.

When the user wishes to stop the flow of liquid, they stop pushing down on the actuator button 142. This allows the internal pressure within the interior volume 105 of the beverage container 102 to push the valve member 139 against the valve seat 140. This stops the flow of liquid in the device.

When the user wishes they may swivel the external straw 108 over the top of the cap 101. The shape and placement of the external straw 108, cap 101, and actuator button 142 is such that when the external straw 108 is in the fully stowed position, it is mechanically held in position against inadvertent movement and physically blocks access to the actuator button 142. This makes the device safe to stow and transport, without worry of inadvertently actuating the device to dispense.

With continued reference to FIGS. 1-11, a third example aspect is a system to infuse a beverage with both a soluble substance, such as tea, coffee, or other infusible product, and a gas then dispense it:

The user inserts into the interior volume 105 of the beverage container 102 a brewing basket, filter 123, or other device filled with the substance to be infused. The user fills the interior volume 105 of the beverage container 102 to a predetermined level with water. The user installs the cap 101 by screwing the cap 101 down until the main seal 145 is securely sealed to the inner wall 103 of the beverage container 102. The user then sets the device aside for a period of time while the water in the interior volume 105 of the beverage container 102 is infused to the desired level.

The user installs a compressed-gas cartridge 111 into the enclosure 114. The user installs the pressure regulator 110 into the cartridge receptacle until the low-pressure seal 155 is sealed against the enclosure 114, the cartridge seal 147 is sealed against the compressed-gas cartridge 111, and the piercing element 115 has broken the top of the compressed-gas cartridge 111 so that the high pressure gas is accessed. The pressure regulator 110 allows gas to flow into the interior volume 105 of the beverage container 102 until the preset pressure is reached. The user agitates the pressurized vessel and its contents to promote gas infusion. After agitation, the user makes the vessel ready for dispensing by moving the external straw 108 to the open position. The user may then dispense the beverage by two example methods:

In the first example method, the user sucks on the external straw 108. This cause a pressure differential between the discharge channel 136 and the ambient environment. This pressure differential acting on the diaphragm 138 creates a force that moves the valve member 139 away from the valve seat 140 against the pressure within the interior volume 105 of the beverage container 102. This allows the beverage to flow up the internal straw 109, past the gap between the valve member 139 and the valve seat 140, and through the discharge channel 136, into the external straw 108 and to the user.

When the user wishes to stop the flow of liquid, they stop sucking against the external straw 108. This removes the pressure differential on the diaphragm 138, which allows the internal pressure within the interior volume 105 of the beverage container 102 to push the valve member 139 against the valve seat 140. This stops the flow of liquid in the device.

In the second example method, the user pushes down on the actuator button 142. This manually forces the valve member 139 away from the valve seat 140 against the pressure within the interior volume 105 of the beverage container 102. This allows beverage to flow up the internal straw 109, past the gap between the valve member 139 and the valve seat 140, and through the discharge channel 136, into the external straw 108 and to the user.

When the user wishes to stop the flow of liquid, they stop pushing down on the actuator button 142. This allows the internal pressure within the interior volume 105 of the beverage container 102 to push the valve member 139 against the valve seat 140. This stops the flow of liquid in the device.

When the user wishes, they may swivel the external straw 108 over the top of the cap 101. The shape and placement of the external straw 108, cap 101, and actuator button 142 is such that when the external straw 108 is in the fully stowed position, it is mechanically held in position against inadvertent movement and physically blocks access to the actuator button 142. This makes the device safe to stow and transport without worry of inadvertently actuating the device to dispense.

EXAMPLES

Illustrative examples of the disclosed technologies are provided below. A particular configuration of the technologies may include one or more, and any combination of, the examples described below.

Example 1 includes s pressurized beverage dispenser comprising: a beverage container; and a cap, the cap including: a cap body; a compressed-gas cartridge accepted within the cap body, the compressed-gas cartridge configured to provide gas under pressure; an external straw extending from the cap body, the external straw having an internal passageway for delivering a beverage to an outlet end of the external straw; a discharge chamber within the cap body being in fluid communication with the internal passageway of the external straw; a metering valve configured to allow a flow of beverage from the beverage container to the discharge chamber when the metering valve is open and to substantially preclude the flow of beverage into the discharge chamber when the metering valve is closed; a diaphragm configured to open the metering valve when the diaphragm is activated and to close the metering valve when the diaphragm is deactivated, the diaphragm further configured to activate when a user sucks on the outlet end of the external straw to create suction within the discharge chamber, the discharge chamber being bounded in part by the diaphragm; and an actuator on the cap body and coupled to the diaphragm, the actuator configured to activate the diaphragm when the user manually engages the actuator.

Example 2 includes the beverage dispenser of Example 1, in which the external straw is configured to be positioned in a closed position, substantially blocking user access to the actuator, and in a dispensing position, allowing user access to the actuator.

Example 3 includes the beverage dispenser of any of Examples 1-2, in which the external straw is pivotably connected to the cap body, the external straw being configured to rotate between a closed position, substantially blocking user access to the actuator, and a dispensing position, allowing user access to the actuator.

Example 4 includes the beverage dispenser of Example 3, in which the actuator comprises an actuator button on an upper side of the cap body, the actuator button configured to activate the diaphragm when the user depresses the actuator button, and in which the external straw is pivotably connected to the upper side of the cap body, the external straw substantially blocking user access to the actuator button in the closed position of the external straw, the external straw allowing user access to the actuator button in the dispensing position of the external straw.

Example 5 includes the beverage dispenser of any of Examples 1-4, the metering valve comprising a valve member and a valve seat, the valve member being unseated from the valve seat when the metering valve is open, and the valve member being seated against the valve seat when the metering valve is closed, the valve seat being downstream of the valve member in a direction of beverage flow through the metering valve.

Example 6 includes the beverage dispenser of any of Examples 1-5, further comprising an internal straw extending from an underside of the cap body and configured to provide a conduit for beverage from a pressurized beverage container.

Example 7 includes the beverage dispenser of Example 6, in which the internal straw comprises: a tubular portion; and a flow restrictor within the tubular portion, the flow restrictor having a converging portion, a throat, and a diverging portion, the diverging portion having an inner diameter that smoothly increases in a direction of flow from the throat.

Example 8 includes the beverage dispenser of any of Examples 1-7, the cap body comprising a pressure chamber configured to accept a pressure regulator and the compressed-gas cartridge.

Example 9 includes the beverage dispenser of Example 8, further comprising a relief valve configured to vent excess pressure from the pressure chamber.

Example 10 includes the beverage dispenser of any of Examples 1-9, further comprising an enclosure configured to substantially surround the compressed-gas cartridge, the enclosure having a one-way valve configured to vent pressurized gas from a region within the enclosure to a region outside of the enclosure, the one-way valve further configured to substantially preclude beverage from entering the enclosure from the region outside of the enclosure.

Example 11 includes the beverage dispenser of any of Examples 1-10, further comprising: a pressure regulator removably coupled to the cap body, the pressure regulator configured to be removed from the cap body by twisting the pressure regulator in a first rotative direction relative to the cap body; a locking component coupled to the pressure regulator; and a lock actuator coupled to the cap body and configured to mechanically engage the locking component and prevent rotation of the pressure regulator in the first rotative direction when the cap is installed on a beverage container and to disengage from the locking component and allow rotation of the pressure regulator in the first rotative direction when the cap is not installed on the beverage container.

Example 12 includes the beverage dispenser of Example 11, in which the locking component comprises a locking ring having a series of teeth extending away from a main portion of the locking ring, the lock actuator being configured to engage one or more of the series of teeth of the locking ring to prevent rotation of the pressure regulator in the first rotative direction when the cap is installed on a beverage container and to disengage from the series of teeth of the locking ring and allow rotation of the pressure regulator in the first rotative direction when the cap is not installed on a beverage container.

Example 13 includes a straw for dispensing a beverage from a pressurized beverage container, the straw comprising: a tubular portion; and a flow restrictor within the tubular portion, the flow restrictor having a converging portion, a throat, and a diverging portion, the diverging portion having an inner diameter that smoothly increases in a direction of flow from the throat.

Example 14 includes the straw of Example 13, further comprising a filter at an inlet end of the flow restrictor.

Example 15 includes the straw of any of Examples 13-14, in which the tubular portion has an inlet end and an outlet end, and in which the flow restrictor is at the inlet end of the tubular portion.

Example 16 includes a cap for a pressurized beverage container, the cap comprising: a cap body; a pressure regulator removably coupled to the cap body, the pressure regulator configured to be removed from the cap body by twisting the pressure regulator in a first rotative direction relative to the cap body; a locking component coupled to the pressure regulator; a lock actuator coupled to the cap body and configured to mechanically engage the locking component and prevent rotation of the pressure regulator in the first rotative direction when the cap is installed on a beverage container and to disengage from the locking component and allow rotation of the pressure regulator in the first rotative direction when the cap is not installed on the beverage container.

Example 17 includes the cap of Example 16, in which the pressure regulator is threaded into the cap body, the first rotative direction relative to the cap body being a direction to unthread the pressure regulator from the cap body.

Example 18 includes the cap of any of Examples 16-17, in which the locking component comprises a locking ring coupled to the pressure regulator.

Example 19 includes the cap of Example 18, in which the locking ring has a series of teeth extending away from a main portion of the locking ring, the lock actuator being configured to engage one or more of the series of teeth of the locking ring to prevent rotation of the pressure regulator in the first rotative direction when the cap is installed on a beverage container and to disengage from the series of teeth of the locking ring and allow rotation of the pressure regulator in the first rotative direction when the cap is not installed on a beverage container.

Example 20 includes the cap of any of Examples 16-19, in which the lock actuator comprises an actuator pin extending through an underside of the cap body, the actuator pin configured to engage a rim of a beverage container when the cap is installed on the beverage container, the actuator pin configured to be pushed by the rim of the beverage container in a direction away from the rim of the beverage container when the cap is installed on the beverage container.

Example 21 includes a cap for a pressurized beverage container, the cap comprising: a cap body; an external straw extending from the cap body, the external straw having an internal passageway for delivering a beverage to an outlet end of the external straw; a discharge chamber within the cap body being in fluid communication with the internal passageway of the external straw; a metering valve configured to allow a flow of beverage into the discharge chamber when the metering valve is open and to substantially preclude the flow of beverage into the discharge chamber when the metering valve is closed; a diaphragm configured to open the metering valve when the diaphragm is activated and to close the metering valve when the diaphragm is deactivated, the diaphragm further configured to activate when a user sucks on the outlet end of the external straw to create suction within the discharge chamber, the discharge chamber being bounded in part by the diaphragm; and an actuator on the cap body and coupled to the diaphragm, the actuator configured to activate the diaphragm when the user manually engages the actuator.

Example 22 includes the cap of Example 21, in which the external straw is configured to be positioned in a closed position, substantially blocking user access to the actuator, and in a dispensing position, allowing user access to the actuator.

Example 23 includes the cap of Example 21, in which the external straw is pivotably connected to the cap body, the external straw being configured to rotate between a closed position, substantially blocking user access to the actuator, and a dispensing position, allowing user access to the actuator.

Example 24 includes the cap of Example 23, in which the actuator comprises an actuator button on an upper side of the cap body, the actuator button configured to activate the diaphragm when the user depresses the actuator button, and in which the external straw is pivotably connected to the upper side of the cap body, the external straw substantially blocking user access to the actuator button in the closed position of the external straw, the external straw allowing user access to the actuator button in the dispensing position of the external straw.

Example 25 includes the cap of any of Examples 21-24, the metering valve comprising a valve member and a valve seat, the valve member being unseated from the valve seat when the metering valve is open, and the valve member being seated against the valve seat when the metering valve is closed, the valve seat being downstream of the valve member in a direction of beverage flow through the metering valve.

Example 26 includes the cap of any of Examples 21-25, further comprising an underside straw extending from an underside of the cap body and configured to provide a conduit for beverage from a pressurized beverage container.

Example 27 includes the cap of Example 26, in which the underside straw comprises: a tubular portion; and a flow restrictor within the tubular portion, the flow restrictor having a converging portion, a throat, and a diverging portion, the diverging portion having an inner diameter that smoothly increases in a direction of flow from the throat.

Example 28 includes the cap of any of Examples 21-27, the cap body comprising a pressure chamber configured to accept a pressure regulator and a compressed-gas cartridge.

Example 29 includes the cap of Example 28, further comprising a relief valve configured to vent excess pressure from the pressure chamber.

Example 30 includes the cap of any of Examples 21-29, further comprising an enclosure configured to substantially surround a compressed-gas cartridge, the enclosure having a one-way valve configured to vent pressurized gas from a region within the enclosure to a region outside of the enclosure, the one-way valve further configured to substantially preclude beverage from entering the enclosure from the region outside of the enclosure.

Example 31 includes the cap of any of Examples 21-30, further comprising: a pressure regulator removably coupled to the cap body, the pressure regulator configured to be removed from the cap body by twisting the pressure regulator in a first rotative direction relative to the cap body; a locking component coupled to the pressure regulator; and a lock actuator coupled to the cap body and configured to mechanically engage the locking component and prevent rotation of the pressure regulator in the first rotative direction when the cap is installed on a beverage container and to disengage from the locking component and allow rotation of the pressure regulator in the first rotative direction when the cap is not installed on the beverage container.

Example 32 includes the cap of Example 31, in which the locking component comprises a locking ring having a series of teeth extending away from a main portion of the locking ring, the lock actuator being configured to engage one or more of the series of teeth of the locking ring to prevent rotation of the pressure regulator in the first rotative direction when the cap is installed on a beverage container and to disengage from the series of teeth of the locking ring and allow rotation of the pressure regulator in the first rotative direction when the cap is not installed on a beverage container.

Example 33 includes the cap of any of Examples 21-32, the diaphragm further configured to deflect an amount away from the metering valve after closing the metering valve to create suction within the discharge chamber.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular example configuration, that feature can also be used, to the extent possible, in the context of other example configurations.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "vertical," "horizontal," "right," and "left" are used for convenience and in reference to the views provided in figures. But the apparatus may have a number of orientations in actual use. Thus, a feature that is vertical, horizontal, to the right, or to the left in the figures may not have that same orientation or direction in actual use.

Although specific example configurations have been described for purposes of illustration, it will be understood that various modifications may be made without departing from the spirit and scope of the disclosure.

We claim:

1. A pressurized beverage dispenser comprising:

a beverage container; and a cap, the cap including:

a cap body;

a compressed-gas cartridge accepted within the cap body, the compressed-gas cartridge configured to provide gas under pressure;

an external straw extending from the cap body, the external straw having an internal passageway for delivering a beverage to an outlet end of the external straw;

a discharge chamber within the cap body being in fluid communication with the internal passageway of the external straw;

a metering valve configured to allow a flow of beverage from the beverage container to the discharge chamber when the metering valve is open and to substantially preclude the flow of beverage into the discharge chamber when the metering valve is closed;

a diaphragm configured to open the metering valve when the diaphragm is activated and to close the metering valve when the diaphragm is deactivated, the diaphragm further configured to activate when a user sucks on the outlet end of the external straw to create suction within the discharge chamber, the discharge chamber being bounded in part by the diaphragm; and an actuator on the cap body and coupled to the diaphragm, the actuator configured to activate the diaphragm when the user manually engages the actuator.

2. The beverage dispenser of claim 1, in which the external straw is configured to be positioned in a closed position, substantially blocking user access to the actuator, and in a dispensing position, allowing user access to the actuator.

3. The beverage dispenser of claim 1, in which the external straw is pivotably connected to the cap body, the external straw being configured to rotate between a closed position, substantially blocking user access to the actuator, and a dispensing position, allowing user access to the actuator.

4. The beverage dispenser of claim 3, in which the actuator comprises an actuator button on an upper side of the cap body, the actuator button configured to activate the diaphragm when the user depresses the actuator button, and in which the external straw is pivotably connected to the upper side of the cap body, the external straw substantially blocking user access to the actuator button in the closed position of the external straw, the external straw allowing user access to the actuator button in the dispensing position of the external straw.

5. The beverage dispenser of claim 1, the metering valve comprising a valve member and a valve seat, the valve member being unseated from the valve seat when the metering valve is open, and the valve member being seated against the valve seat when the metering valve is closed, the valve seat being downstream of the valve member in a direction of the flow of beverage through the metering valve.

6. The beverage dispenser of claim 1, further comprising an internal straw extending from an underside of the cap body and configured to provide a conduit for the beverage from the pressurized beverage container.

7. The beverage dispenser of claim 6, in which the internal straw comprises:

a tubular portion; and a flow restrictor within the tubular portion, the flow restrictor having a converging portion, a throat, and a diverging portion, the diverging portion having an inner diameter that increases in a direction of flow from the throat.

8. The beverage dispenser of claim 1, the cap body comprising a pressure chamber configured to accept a pressure regulator and the compressed-gas cartridge.

9. The beverage dispenser of claim 8, further comprising a relief valve configured to vent excess pressure from the pressure chamber.

10. The beverage dispenser of claim 1, further comprising an enclosure configured to substantially surround the compressed-gas cartridge, the enclosure having a one-way valve configured to vent pressurized gas from a region within the enclosure to a region outside of the enclosure, the one-way valve further configured to substantially preclude the beverage from entering the enclosure from the region outside of the enclosure.

11. The beverage dispenser of claim 1, further comprising:

a pressure regulator removably coupled to the cap body, the pressure regulator configured to be removed from the cap body by twisting the pressure regulator in a first rotative direction relative to the cap body;

a locking component coupled to the pressure regulator; and a lock actuator coupled to the cap body and configured to mechanically engage the locking component and prevent rotation of the pressure regulator in the first rotative direction when the cap is installed on the beverage container and to disengage from the locking component and allow rotation of the pressure regulator in the first rotative direction when the cap is not installed on the beverage container.

12. The beverage dispenser of claim 11, in which the locking component comprises a locking ring having a series of teeth extending away from a main portion of the locking ring, the lock actuator being configured to engage one or more of the series of teeth of the locking ring to prevent rotation of the pressure regulator in the first rotative direction when the cap is installed on the beverage container and to disengage from the series of teeth of the locking ring and allow rotation of the pressure regulator in the first rotative direction when the cap is not installed on the beverage container.

13. A cap for a pressurized beverage container, the cap comprising:

a cap body;

a pressure regulator removably coupled to the cap body, the pressure regulator configured to be removed from the cap body by twisting the pressure regulator in a first rotative direction relative to the cap body;

a locking component coupled to the pressure regulator;

a lock actuator coupled to the cap body and configured to mechanically engage the locking component and prevent rotation of the pressure regulator in the first rotative direction when the cap is installed on a beverage container and to disengage from the locking component and allow rotation of the pressure regulator in the first rotative direction when the cap is not installed on the beverage container.

14. The cap of claim 13, in which the pressure regulator is threaded into the cap body, the first rotative direction relative to the cap body being a direction to unthread the pressure regulator from the cap body.

15. The cap of claim 13, in which the locking component comprises a locking ring coupled to the pressure regulator.

16. The cap of claim 15, in which the locking ring has a series of teeth extending away from a main portion of the locking ring, the lock actuator being configured to engage one or more of the series of teeth of the locking ring to prevent rotation of the pressure regulator in the first rotative direction when the cap is installed on the beverage container and to disengage from the series of teeth of the locking ring and allow rotation of the pressure regulator in the first rotative direction when the cap is not installed on the beverage container.

17. The cap of claim 13, in which the lock actuator comprises an actuator pin extending through an underside of the cap body, the actuator pin configured to engage a rim of the beverage container when the cap is installed on the beverage container, the actuator pin configured to be pushed by the rim of the beverage container in a direction away from the rim of the beverage container when the cap is installed on the beverage container.

18. A cap for a pressurized beverage dispenser comprising:

a cap body;

an external straw extending from the cap body, the external straw having an internal passageway for delivering a beverage to an outlet end of the external straw;

a discharge chamber within the cap body being in fluid communication with the internal passageway of the external straw;

a metering valve configured to allow a flow of beverage from the beverage container to the discharge chamber when the metering valve is open and to substantially preclude the flow of beverage into the discharge chamber when the metering valve is closed;

a diaphragm configured to open the metering valve when the diaphragm is activated and to close the metering valve when the diaphragm is deactivated, the diaphragm further configured to activate when a user sucks on the outlet end of the external straw to create suction within the discharge chamber, the discharge chamber being bounded in part by the diaphragm; and an actuator on the cap body and coupled to the diaphragm, the actuator configured to activate the diaphragm when the user manually engages the actuator.

19. The beverage dispenser of claim 18, in which the external straw is configured to be positioned in a closed position, substantially blocking user access to the actuator, and in a dispensing position, allowing user access to the actuator.

20. The cap of claim 18, in which the external straw is pivotably connected to the cap body, the external straw being configured to rotate between a closed position, substantially blocking user access to the actuator, and a dispensing position, allowing user access to the actuator.

21. The cap of claim 20, in which the actuator comprises an actuator button on an upper side of the cap body, the actuator button configured to activate the diaphragm when the user depresses the actuator button, and in which the external straw is pivotably connected to the upper side of the cap body, the external straw substantially blocking user access to the actuator button in the closed position of the external straw, the external straw allowing user access to the actuator button in the dispensing position of the external straw.

22. The cap of claim 18, the metering valve comprising a valve member and a valve seat, the valve member being unseated from the valve seat when the metering valve is open, and the valve member being seated against the valve seat when the metering valve is closed, the valve seat being downstream of the valve member in a direction of the flow of beverage through the metering valve.

23. The cap of claim 18, further comprising an internal straw extending from an underside of the cap body and configured to provide a conduit for beverage from a pressurized beverage container.

24. The cap of claim 23, in which the internal straw comprises:

a tubular portion; and a flow restrictor within the tubular portion, the flow restrictor having a converging portion, a throat, and a diverging portion, the diverging portion having an inner diameter that increases in a direction of flow from the throat.

25. The cap of claim 18, the cap body comprising a pressure chamber configured to accept a pressure regulator and a compressed-gas cartridge.

26. The cap of claim 25, further comprising a relief valve configured to vent excess pressure from the pressure chamber.

27. The cap of claim 18, further comprising an enclosure configured to substantially surround a compressed-gas cartridge, the enclosure having a one-way valve configured to vent pressurized gas from a region within the enclosure to a region outside of the enclosure, the one-way valve further configured to substantially preclude beverage from entering the enclosure from the region outside of the enclosure.

28. The cap of claim 18, further comprising:

a pressure regulator removably coupled to the cap body, the pressure regulator configured to be removed from the cap body by twisting the pressure regulator in a first rotative direction relative to the cap body;

a locking component coupled to the pressure regulator; and a lock actuator coupled to the cap body and configured to mechanically engage the locking component and prevent rotation of the pressure regulator in the first rotative direction when the cap is installed on a beverage container and to disengage from the locking component and allow rotation of the pressure regulator in the first rotative direction when the cap is not installed on the beverage container.

29. The cap of claim 28, in which the locking component comprises a locking ring having a series of teeth extending away from a main portion of the locking ring, the lock actuator being configured to engage one or more of the series of teeth of the locking ring to prevent rotation of the pressure regulator in the first rotative direction when the cap is installed on the beverage container and to disengage from the series of teeth of the locking ring and allow rotation of the pressure regulator in the first rotative direction when the cap is not installed on the beverage container.

30. The cap of claim 18, the diaphragm further configured to deflect an amount away from the metering valve after closing the metering valve to create suction within the discharge chamber.

* * * * *